United States Patent [19]
Whitener

[11] 3,951,166
[45] Apr. 20, 1976

[54] RAPID ACTING VALVE ASSEMBLY

[76] Inventor: Robert V. Whitener, 20 Tall Tree Court, Huntington, Long Island, N.Y. 11743

[22] Filed: June 12, 1974

[21] Appl. No.: 478,628

[52] U.S. Cl. ..................... 137/625.27; 137/625.69
[51] Int. Cl.² ........................................ F16K 11/00
[58] Field of Search ............... 137/625.27, 625.65, 137/625.26, 625.69; 251/356

[56] References Cited
UNITED STATES PATENTS

| | | | |
|---|---|---|---|
| 2,976,852 | 3/1961 | Goldring | 137/625.65 X |
| 2,989,989 | 6/1961 | Whaley et al. | 137/625.69 |
| 3,191,626 | 6/1965 | Leibfritz | 137/625.69 |
| 3,542,065 | 11/1970 | Holbrook | 137/625.69 X |
| 3,819,152 | 6/1974 | Clippard | 251/367 |
| R25,251 | 10/1962 | Quail | 137/625.69 X |

FOREIGN PATENTS OR APPLICATIONS

| | | | |
|---|---|---|---|
| 645,277 | 7/1962 | Canada | 137/625.69 |
| 331,648 | 7/1956 | Switzerland | 137/625.27 |
| 1,176,707 | 6/1957 | France | 137/625.65 |

Primary Examiner—Martin P. Schwadron
Assistant Examiner—Robert J. Miller
Attorney, Agent, or Firm—Imirie, Smiley & Linn

[57] ABSTRACT

A valve assembly having a plurality of coaxial disposed bores, a central one thereof being slightly enlarged in diameter and accommodating a plurality of ring inserts for cooperation with a number of thin disc valve members each carrying an O-ring seal in a rectangular peripheral groove. The valve assembly includes at least two ports communicating with the enlarged interior bore on opposite sides of the annular ring insert, and at least one axial aperture extends through the side walls of the groove of the disc valves to enable release of pressure otherwise existing under the O-ring seal.

14 Claims, 10 Drawing Figures

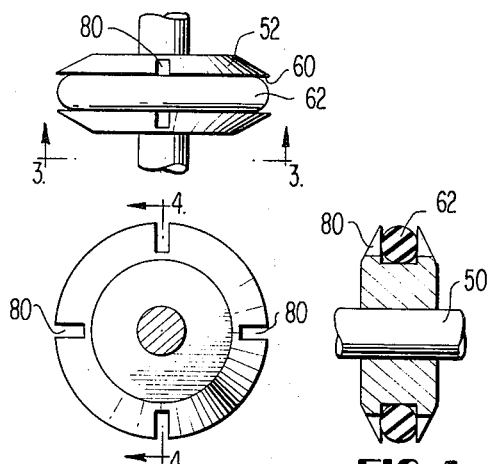
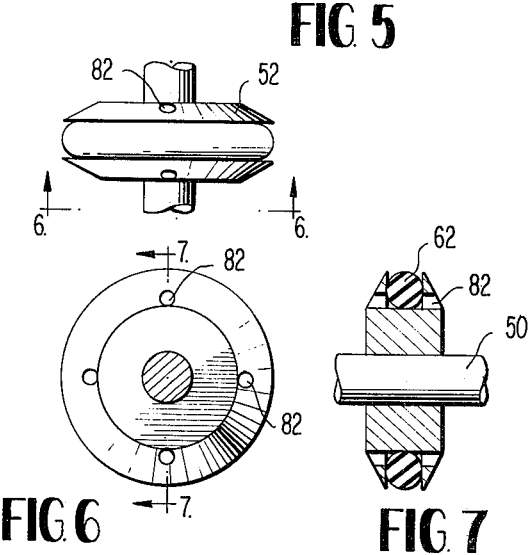
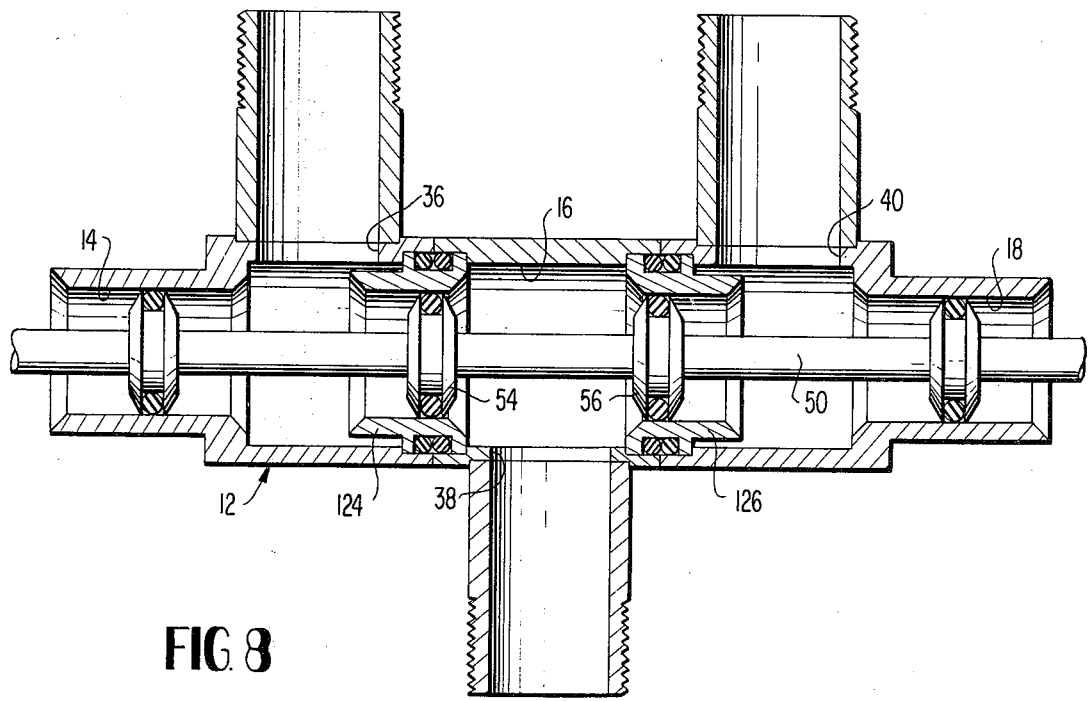

RAPID ACTING VALVE ASSEMBLY

BACKGROUND OF THE INVENTION

1. Field of the Invention:

The present invention relates generally to valve assemblies, and more particularly, to a rapid acting, fully balanced valve assembly having particularly advantageous O-ring seal carrying valve members.

2. Description of the Prior Art:

Numerous applications presently exist for valves and valve assemblies capable of high capacity, ultra-fast slow control of any of various fluids such as water, oil, gas, air, steam and the like. Such valve assemblies, in order to be economically feasible and commercially acceptable, must be capable of rapidly diverting or controlling fluid flow in response to the input of only a slight amount of mechanical force, power or energy to move the control stem. In addition, it is often desirable that the valve assemblies be light weight and minimally complex. This, of course, has the inherent advantage of minimizing both initial construction costs as well as subsequent maintenance outlays while at the same time decreasing unproductive down time of overall systems incorporating such a valve assembly.

While the prior art, as exemplified by U.S. Pat. Nos. 2,656,144, 2,702,049, 3,049,239, 3,191,626, and 3,338,550, is generally cognizant of various valve assemblies capable of both mechanical and electrical actuation and balanced for at least certain fluid flow conditions, these types of valve arrangements have not proven to be fully satisfactory in that they are typically complex, are prone to valve damage after repeated operation, do not hold pressure well in both flow directions, are incapable of extremely rapid operation, and require many complex parts which are not easily manufactured.

The desirable characteristics of a valve assembly for general use have long been well known as well as the various undesirable characteristics and disadvantages exhibited generally by the prior art. Nevertheless, and despite the fact that many new valve designs have been attempted in the past and are presently being attempted in an effort to solve these deficiencies, there has heretofore been unavailable a simple, efficient, and economical valve structure capable of rapidly controlling substantial fluid flow situations with only a minimum of energy input. In addition, while attempts have been made in the past to provide valve assemblies with O-ring seals capable of extended use, full realization of the dynamics of an O-ring seal has hindered valve designers and engineers from developing in the past a valve assembly exhibiting vastly superior O-ring seal wear characteristics.

SUMMARY OF THE INVENTION

It is, therefore, an object of the present invention to construct a rapid acting, fully balanced, compact valve assembly capable of controlling high pressure stream flows with minimal energy input.

The present invention has a further object in the construction of a valve assembly having an enlarged internal bore accommodating at least one annular ring for coaction with a disc valve carrying an O-ring seal thereabout.

It is a further object of the present invention to efficiently release pressure otherwise acting to unseat and damage an O-ring seal disposed about the periphery of a valve member.

The present invention is summarized in that a valve assembly includes a main body member defining at least first, second, and third substantially cylindrical bores therein, the first and third bores being axially aligned with the second bore and disposed on either side thereof in contiguous relationship, and first and third bores having a substantially equal diameter which is less than the diameter of the second bore; an annular ring having an outer diameter equal to the diameter of the second bore and an inner diameter substantially equal to the diameter of one of the first and third bores, the ring being fixedly disposed in fluid-tight relationship in the second bore; first and second ports communicating with the second bore on opposite sides of the ring; a valve steam extending axially through the first, second and third bores; an actuating assembly connected with the stem for actually transposing the same; and at least three valve discs having substantially equal diameters, two of the discs disposed on the steam for continuous, sliding cooperation with the first and third bores, respectively, to seal the interior of the valve assembly, and the third disc disposed on the stem for selective cooperation with the ring so as to control fluid flow between the first and second ports in response to movement of the stem by the transposing assembly.

The present invention is materially advantageous over the prior art in that it is light-weight, compact, includes few parts, may be rapidly reset, is fully balanced in both flow directions, is capable of controlling or diverting high pressure stream flows with minimal input energy, exhibits a high repetition rate without damage, and is capable of extremely rapid operation.

Other objects and advantages of the present invention will become apparent from the following description of the preferred embodiments when taken in conjunction with the accompanying drawings.

BRIEF DESCRIPTION OF THE DRAWINGS

FIG. 2 is a side elevational view of a valve disc of the valve assembly of FIG. 1;

FIG. 3 is a front elevational view taken along line 3—3 of FIG. 2;

FIG. 4 is a cross-sectional view taken along line 4—4 of FIG. 3;

FIG. 5 is a side elevational view of a modification of the valve disc of FIG. 2;

FIG. 6 is a front elevational view taken along line 6—6 of FIG. 5;

FIG. 7 is a cross-sectional view taken along line 7—7 of FIG. 6;

FIG. 8 is a partial cross-sectional view of another embodiment of the valve assembly according to the present invention;

DESCRIPTION OF THE PREFERRED EMBODIMENTS

Figure 1:
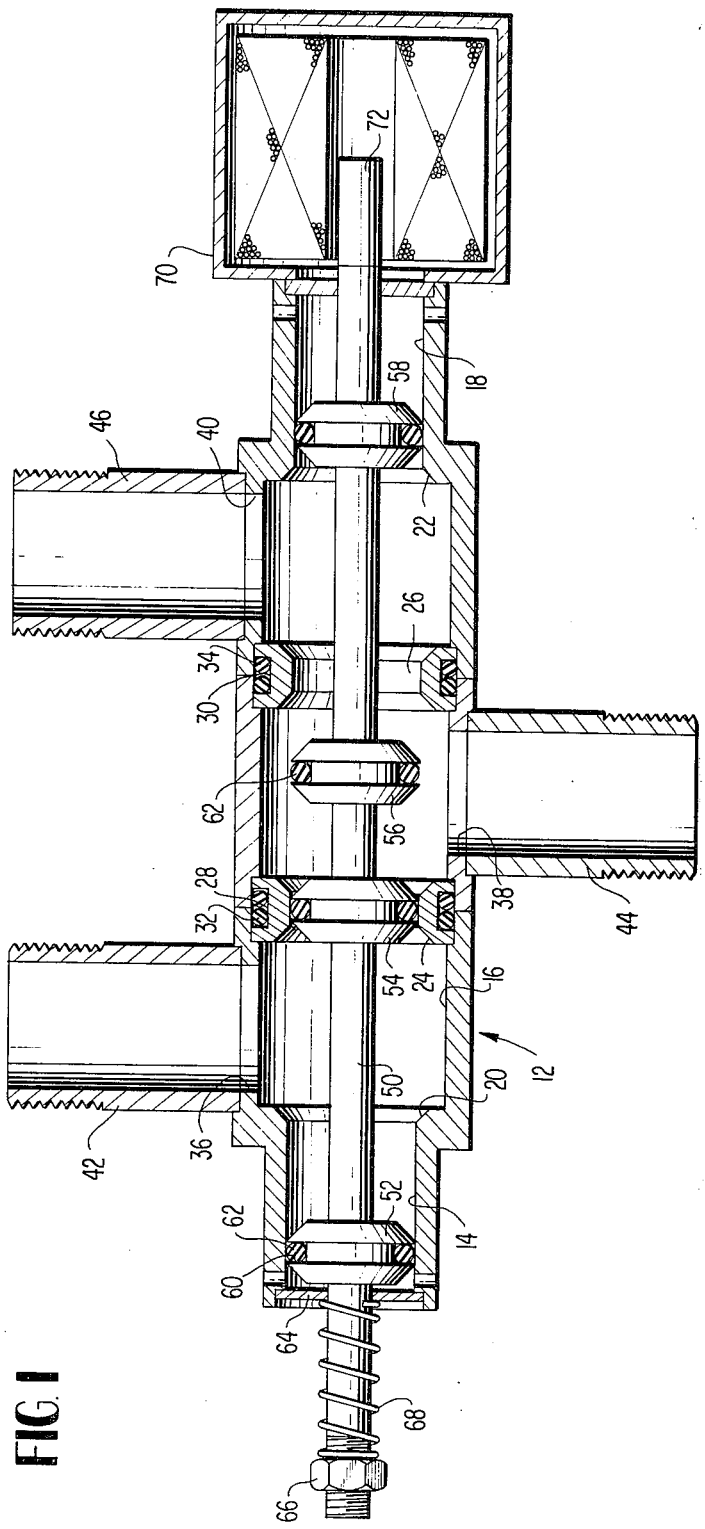
FIG. 1 is a cross-sectional view of a preferred embodiment of a valve assembly according to the present invention.

Referring to FIG. 1 there is shown a preferred embodiment of a valve assembly according to the present invention which includes a main casing or housing 12 defining first, second and third bores 14, 16 and 18, respectively, which extend in axial alignment completely therethrough. Bores 14 and 18 are contiguous with the enlarged central bore 16 and meet at chamfered edges 20 and 22, respectively. The diameter of the central bore 16 is greater than that of bores 14 and 18 so as to accommodate annular rings 24 and 26 which are fixedly disposed in fluid-tight relationship therein.

Annular rings 24 and 26 are preferably identical and have a generally U-shaped cross-section with substantially flat outer and inner peripheral surfaces. A rectangular groove 28–30 is formed in the outer surface of rings 24 and 26 for accommodating one or more O-ring seals 32–34. Seals 32 and 34 cooperate with the interior side walls of bore 16 to establish a fluid-tight relationship between. In addition, the annular rings 24 and 26 are held in a fixed axial position within bore 16 by any suitable means such as by accommodating the same within a shallow groove formed in the side wall of the bore.

It is noted at this point that the entire main body section 12 of the valve assembly of the present invention is preferably formed in sections designed to be joined at or near the location of the annular rings 24 and 26 to facilitate ease in assembling the device. It should also be understood that the entire assembly is designed to be fluid-tight and that the various sections after being joined, may be held in position by any suitable means such as by a plurality of elongated bolts extending axially through the main body member 12.

The inner surface of rings 24 and 26 is outwardly divergent at both sides thereof so as to more efficiently promote sealing engagement of the valve discs, to be further described below, therewith.

A plurality of preferably circular fluid ports 36, 38 and 40 are defined in the walls of the main body 12 in communication with the enlarged central bore 16. Port 38 is disposed intermediate the fixed position of annular rings 24 and 26, while ports 36 and 40 are respectively disposed on opposite sides of the rings from port 38. Any suitable fittings such as cylindrical extensions 42, 44, and 46 may extend, respectively, from ports 36, 38 and 40 to facilitate interconnection of the valve assembly with fluid flow lines of the system in which the valve is ultimately used. While the fittings 42, 44 and 46 have been illustrated herein as discreet cylindrical extensions of the main body 12 it should be appreciated that the same may be integrally formed therewith or otherwise joined as by screw threads as desired. In fact, the entire valve body assembly may be formed by interconnecting a plurality of identical or annular ring 24 and valve disc 56 is spaced from annular ring 26. In this position, port 38 is isolated from communication with port 36 but is placed in communication with port 40. An appropriate solenoid assembly 70 is mounted adjacent bore 18 on main body member 12 and coacts with a core 72 attached to stem 50 to effect transposition thereof to an actuated position whereupon discs 52 and 58 remain sealed within bores 14 and 18 and disc 54 is moved away from annular ring 24 while disc 56 is moved into sealing engagement within annular ring 26. In this position, port 38 communicates with port 36 and is isolated from communication from port 40.

It can be appreciate from the aforegoing, that the valve assembly according to the present invention may be constructed with minimal difficulty and includes relatively few parts and virtually no parts of complex shape. Furthermore, in view of the unique nature of the valve discs 52, 54, 56 and 58 and their direct mounting upon valve stem 50, the overall assembly is extremely lightweight and compact and provides very rapid flow switchover during operation. Also, it can be appreciated that the valve assembly illustrated in FIG. 1 is fully balanced with respect to flows through any of the ports and in any direction. In other words, a pressure stream passing through port 38 will act against the right surface of disc 54 and the left surface of disc 58 with equal influence whereupon flow forces which would otherwise cause the shaft 50 to be moved to the left or to the right are effectively cancelled. Likewise, if the flow from port 38 through annular ring 26 and out through port 40 should become reversed, discs 54 and 58 remain in a balanced condition to cancel any forces which might otherwise move the valves down. At the same time, positive or negative fluid pressure existing in the path communicating with port 36 will have an equal effect on substantially identical T fittings having end sections defining bores 14 and 18.

Disposed coaxially through the interior of the main body member 12 is a valve stem 50 having a diameter which is preferably not greater than half the diameter of the smaller bores 14 and 18. The valve stem 50 may take the form of a thin rod having a circular cross-section and has mounted thereon four valve discs 52, 54, 56, and 58. Valve discs 52 through 58 are identical in configuration and are fixedly disposed along the axial length of stem 50 for cooperation with bore 14, annular ring 24, ring 26, and bore 18, respectively. It can be appreciated that in the embodiment of FIG. 1, the internal diameter of bores 14 and 18 is equal to the internal diameter of annular rings 24 and 26 with valves 52 and 58 disposed for continuous, sliding cooperation with end bores 14 and 18, and valve discs 54 and 56 disposed for selective cooperation with annualar rings 24 and 26 as the axial position of valve stem 50 is moved.

Each of the valve disc members 52 through 58 is in the form of a substantially flat disc having a rectangular groove 60 formed about the periphery thereof. Groove 60 is designed to accommodate an O-ring seal 62 having a diameter slightly greater than the width of the groove so as to form a snug fit therein. In addition, the side walls of each disc are radially tapered or chamfered so as to meet with the side walls of groove 60 as shown.

A pair of washers or dust covers 64 and 66 may be mounted in the ends of the main body member 12 adjacent bores 14 and 18 so as to preclude the entry of foreign particles, dust, etc. to the interior of the assembly. One end of valve stem 50 is preferably threaded to receive a nut 66 which cooperate with washer 64 to constrain a compression spring 68 therebetween. Spring 68 acts to bias the valve stem 50 to a first predetermined position, shown in FIG. 1, whereupon the valve disc 54 is positioned in sealing arrangement within the right surface of disc 52 and the left surface of disc 54 such that the stem 50 again remains balanced or neutralized against movement. The same conditions hold true when the valve simply is moved to its actuated position, i.e., the position wherein valve stem 50 is transposed to the right, as visualized in FIG. 1, by the actuation of solenoid 70 in receipt of a control switch.

In connection with the embodiment of the valve assembly illustrated in FIG. 1, it is noted that the axial dimension of discs 54 and 56 is substantially equal to the axial dimension of their respective cooperating annular rings 24 and 26 such that the discs may be rapidly transposed from a closed position to an open position upon movement of the stem 50. Thus, for the configuration illustrated in FIG. 1, the valve assembly acts as a flow diverter to direct a fluid stream passing through port 38 to either port 36 or port 40. By virtue of its construction and design, the valve assembly according to the present invention exhibits an extremely high maximum operating pressure differential or MOPD, which is a rating that must be properly evaluated in system designs where reverse pressure sometimes occurs due to a shutdown or other unusual circumstance. In the present invention, the MOPD is the full safe working pressure of the valve. This is due to the fact that the disc seals are all of the O-ring type cooperating with the interior cylinder walls, and more importantly, that the seal is held in tight position by forces that act to close and neutralize as soon as a positive closure takes place. In other words, the valve assembly seals itself by a small pressure difference due to flow. As explained above, the valve assembly itself is balanced against absolute pressure forces; however, just prior to the time that a disc becomes closed against the interior of one of the annular rings, a small pressure difference will be exhibited because of the fluid flowing dynamically therearound.

Because of the above pressure difference due to flow, as the valve approaches one of its two positions, it tends to quickly become closed whereupon the O-ring sealed disc is moved within its cylindrical seat to affect a fluid-tight seal. No mechanical force is required to maintain the valve member in sealed relationship against its seat, with the result that the full rating of the valve can be applied to any flow port, whether it be closed or opened or acting as an inlet or outlet. The net result is a very rapidly acting assembly which can divert even high flow rate streams in a matter of milliseconds.

Referring now to FIGS. 2 through 4, one of the discs 52 is illustrated in detail and includes four equally spaced apertures 80 extending axially through the side walls of groove 60 adjacent the bottom of the groove as shown. Since it is desired that the valve assembly of the present invention be both rapid acting and positive it is preferred that the O-ring have a diameter slightly larger than the width of the groove so as to make a snug fit therebetween. The axial grooves 80 allow pressure otherwise trapped in the bottom corners of the groove by the O-ring to be released so as to prevent the seal from becoming damaged during operation.

As shown in FIGS. 5 through 7, the axial openings may be in the form of circular holes 82 which again extend through the side walls of the groove and enable pressure otherwise trapped below the O-ring to be released. The disc valve design illustrated in details in FIGS. 2 through 7 recognizes that space is necessary in the bottom of the groove for expansion of the O-ring as the same is squeezed or expanded with heat. Furthermore, it recognizes that gas otherwise trapped below the O-ring can expand greatly and extremely rapidly as the valve is moved from a closed position to an open position. This has often resulted in dislodgment of the O-ring seal or complete destruction thereof and has proven to be a serious disadvantage in the past. The rectangular grooves 80 for the circular holes 82 provided by the present invention effectively enable the pressure to be released from below the O-ring to preclude the disadvantages noted above. Of course, while only two examples of pressure-releasing apertures are illustrated, namely grooves 80 and holes 82, any appropriate perforation or opening may be provided in accordance with the teachings of the present invention so as to prevent excessive pressure from building up behind the O-ring. Since the O-rings are held in the grooves like rubber bands, their inherent elasticity is more than enough to maintain the same in their proper position. The opening or apertures for pressure release should not be so large, however, as to leave the O-ring with insufficient side support. On the other hand, the apertures or openings should be at least large enough so as not to clog during normal use.

In use, when one of the discs moves out of the opening defined by its cooperating annular ring, if high pressure fluid or air is enframed underneath the O-ring seal, it will be free to escape after the disc has moved. Since the O-ring also affects a seal with the bottom of the rectangular groove about the disc, the axial openings in the groove do not detract from the sealing capability of the disc.

In FIG. 8, there is disclosed a second embodiment of a valve assembly according to the present invention, and parts identical to those in FIG. 1 are identically numbered and will not be described again for the sake of brevity. In the assembly of FIG. 8, a pair of annular rings 124 and 126 are substituted for annular rings 24 and 26 in the assembly of FIG. 1. Since the axial dimension of annular rings 124 and 126 is greater than the axial dimension of corresponding discs 54 and 56, the valve assembly will completely shut off flow from port 38 to both ports 36 and 40 in the position illustrated. When stem 50 is moved slightly to the left, as visualized in FIG. 8, disc 54 will remain seated within annular ring 124, however, disc 56 will move away from annular ring 126 to open a fluid passage between ports 38 and 40. Likewise, if stem 50 is moved slightly to the right, as visualized in FIG. 8, disc 56 will remain sealed while disc 54 will be moved away from annular ring 124 so as to open a flow passage between port 38 and port 36. Again, the valve assembly is balanced for all flows and all of the advantages exhibited by the apparatus of FIG. 1 are similarly exhibited by the modification of FIG. 8. In the FIG. 8 embodiment, however, an additional position is available to completely cut off fluid flow from port 38 to either of ports 36 and 40. Thereafter, selective admission of fluid through either of ports 36 and 40 can be readily selectively obtained by merely moving stem 50 slightly to the left or to the right.

Figure 9:
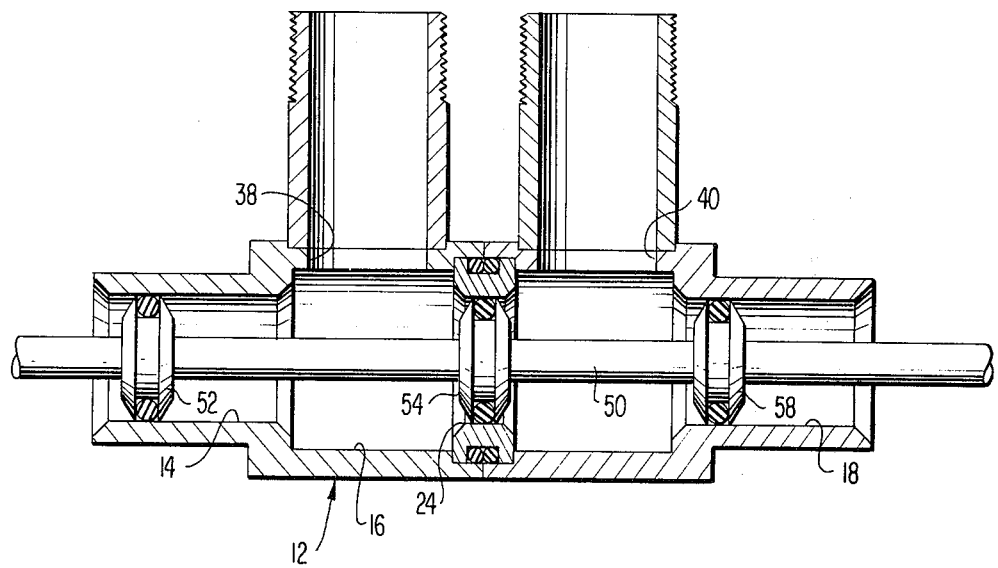
FIG. 9 is a partial sectional view of a further embodiment of the valve assembly according to the present invention.
Figure 10:
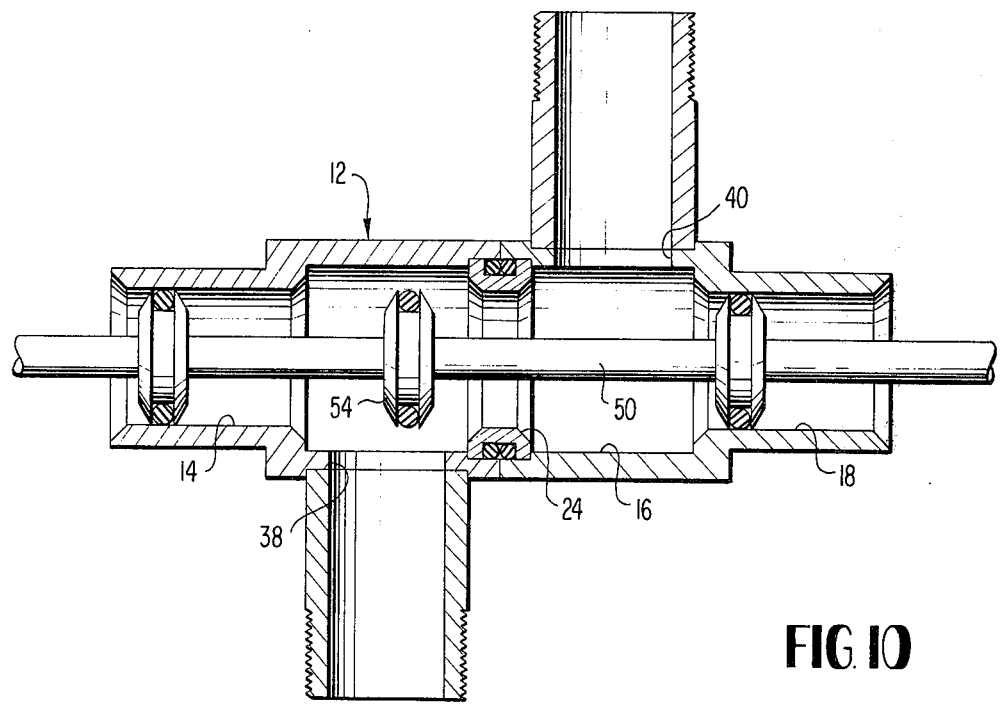
FIG. 10 is a modification of the valve assembly of FIG. 9.

A further embodiment is illustrated in FIG. 9 in which only a single annular ring 24 is disposed in bore 16. Stem 50 has mounted thereon three discs and functions to control the fluid flow between ports 38 and 40 acting as either input or output ports. Again, as in the previously described embodiments, the valve assembly is balanced for all flows in all directions and requires minimal input power to effect a very rapid transposition of the fluid flow from an off to an on condition. A modification of the embodiment of FIG. 9 is illustrated in FIG. 10 wherein the port openings 38 and 40 are shifted 180° from their relative positions as shown in FIG. 9, and the middle disc 54 is slightly shifted to the left on stem 50. The modification of FIG. 10 is therefore a normally on valve while that of FIG. 9 is normally closed when considered in conjunction with the biasing assembly and solenoid operator shown in FIG. 1.

From the foregoing it should be appreciated that valve assemblies and particularly valve discs may be constructed in accordance with the present invention for particularly advantageous operation. While the structure of the assembly is extremely simple, lending to its ease of manufacture and maintenance, it exhibits advantages not possessed by typical valve assemblies presently being used. In particular, its rapid-acting and compact design is accomplished at the same time with the capability of changing high pressure stream flows with minimal input power especially since the system is fully balanced for all flow directions and possesses only a slight unbalance at the instant just prior to closure because of fluid flow dynamics. The valve is thus particularly advantageous when used in connection with systems which must be fail safe or must always assure a positive seal. The assembly is direct acting and includes fewer parts than conventional assemblies of this general type and is considered to represent a material advance in the art.

Inasmuch as the present invention is subject to many variations, modifications and changes in detail, it is intended that all matter contained in the foregoing description or shown in the accompanying drawing, shall be interpreted as illustrative and not in a limiting sense.

I claim:

1. A valve assembly, comprising: a body member defining at least first, second, and third substantially cylindrical bores therein, said first and third bores being axially aligned with said second bore and disposed on either side thereof in contiguous relationship, said first and third bores having a substantially equal diameter less than the diameter of said second bore; an annular protrusion in said second bore having an inner diameter substantially equal to the diameter of one of said first and third bores; first and second ports communicating with said second bore on opposite sides of said protrusion; a valve stem extending axially through said first, second and third bores; means connected with said stem for axially transposing the same; and at least three valve discs having substantially equal diameters, two of said discs disposed on said stem for continuous, sliding cooperation with said first and third bores, respectively, to seal the interior of said valve assembly; and said third disc disposed on said stem for selective cooperation with said annular protrusion so as to control fluid flow between said first and second ports in response to movement of said stem by said transposing means, each of said discs defining a generally rectangular groove about the periphery thereof and having a resilient seal therein, wherein each of said discs defines at least one aperture extending axially therethrough and communicating with the bottom of said rectangular groove.

2. The valve assembly as recited in claim 1 wherein said annular ring has a flat outer peripheral surface and protrusion has a flat inner peripheral surface, the edges of said inner peripheral surface being outwardly divergent to promote the selective cooperation of said third disc therewith.

3. The valve assembly as recited in claim 1 wherein said third disc and said annular protrusion have substantially equal axial dimensions.

4. The valve assembly as recited in claim 1 wherein said annular protrusion has an axial dimension greater than that of said third disc.

5. The valve assembly as recited in claim 1 wherein the inner diameter of said annular protrusion is equal to the diameter of said first and third bores and the diameter of said discs.

6. The valve assembly as recited in claim 1 wherein said annular protrusion is an annular ring sealed in said second bore by at least one O-ring.

7. The valve assembly as recited in claim 1 wherein each of said discs defines four apertures spaced equally thereabout.

8. The valve assembly as recited in claim 1 wherein the diameter of said O-ring seal is slightly greater than the width of said rectangular groove such that said O-ring contacts the side walls of said rectangular groove.

9. The valve assembly as recited in claim 1 wherein said at least one aperture is a groove.

10. The valve assembly as recited in claim 1 wherein each of said discs defines plurality of grooves spaced equally thereabout.

11. The valve assembly as recited in claim 1 wherein each of said discs is radially tapered such that the side walls thereof meet the side walls of said rectangular groove.

12. The valve assembly as recited in claim 1 wherein said transposing means comprises means biasing said stem to a first position and solenoid means coupled with said stem for moving the same from said first position to a second position in response to an actuating signal.

13. The valve assembly as recited in claim 1 wherein said third disc is movable through said annular protrusion to effect a seal with the inner peripheral surface thereof.

14. The valve assembly as recited in claim 1 wherein the surface area of each side of each of said discs is equal whereby the valve assembly is balanced for flow in both directions.

* * * * *